United States Patent
Manni et al.

(10) Patent No.: US 11,381,578 B1
(45) Date of Patent: *Jul. 5, 2022

(54) NETWORK-BASED BINARY FILE EXTRACTION AND ANALYSIS FOR MALWARE DETECTION

(71) Applicant: FireEye, Inc., Milpitas, CA (US)

(72) Inventors: Jayaraman Manni, San Jose, CA (US); Ashar Aziz, Coral Gables, FL (US); Fengmin Gong, Livermore, CA (US); Upendran Loganathan, Santa Clara, CA (US); Muhammad Amin, Fremont, CA (US)

(73) Assignee: FireEye Security Holdings US LLC, Milpitas, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/481,801

(22) Filed: Sep. 9, 2014

Related U.S. Application Data

(63) Continuation of application No. 13/350,645, filed on Jan. 13, 2012, now Pat. No. 8,935,779.

(51) Int. Cl.
- *H04L 29/06* (2006.01)
- *G06N 20/00* (2019.01)
- *H04L 9/40* (2022.01)

(52) U.S. Cl.
CPC .................................. *H04L 63/14* (2013.01)

(58) Field of Classification Search
CPC .......... H04L 63/1408; H04L 2463/144; H04L 63/14; G06F 21/567; G06F 21/566; G06F 21/56; G06F 21/562; G06F 2221/033; G06F 21/50; G06F 21/561; H04W 12/128; H04W 12/122; H04W 12/30; H04W 12/37

USPC ...................................................... 726/22–25
See application file for complete search history.

(56) References Cited

U.S. PATENT DOCUMENTS

| | | | |
|---|---|---|---|
| 4,292,580 | A | 9/1981 | Ott et al. |
| 5,175,732 | A | 12/1992 | Hendel et al. |
| 5,319,776 | A | 6/1994 | Hile et al. |
| 5,440,723 | A | 8/1995 | Arnold et al. |
| 5,490,249 | A | 2/1996 | Miller |
| 5,657,473 | A | 8/1997 | Killean et al. |

(Continued)

FOREIGN PATENT DOCUMENTS

| | | | |
|---|---|---|---|
| GB | 2439806 A | 1/2008 | |
| GB | 2490431 A | 10/2012 | |

(Continued)

OTHER PUBLICATIONS

Xioasong et al., "Analysis of Virtual Machine Applied to Malware Detection System," 2009 International Symposium on Information Engineering and Electronic Commerce Year: 2009 | Conference Paper | Publisher: IEEE.*

(Continued)

*Primary Examiner* — Roderick Tolentino
(74) *Attorney, Agent, or Firm* — Rutan & Tucker, LLP

(57) ABSTRACT

A system and method are disclosed for network-based file analysis for malware detection. Network content is received from a network tap. A binary packet is identified in the network content. A binary file, including the binary packet, is extracted from the network content. It is determined whether the extracted binary file is detected to be malware.

20 Claims, 8 Drawing Sheets

(56) References Cited

U.S. PATENT DOCUMENTS

| | | |
|---|---|---|
| 5,802,277 A | 9/1998 | Cowlard |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,251,215 B1 | 7/2007 | Turner et al. |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |

(56) References Cited

U.S. PATENT DOCUMENTS

| | | |
|---|---|---|
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 * | 9/2014 | Manni .................. G06F 21/566 726/22 |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,881,284 B1 * | 11/2014 | Gabriel ................ G06F 21/566 726/24 |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |

(56) References Cited

U.S. PATENT DOCUMENTS

| | | |
|---|---|---|
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0199763 A1* | 10/2004 | Freund .................... G06F 21/53 713/154 |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0188272 A1* | 8/2005 | Bodorin ................ G06F 21/566 714/38.1 |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0236397 A1* | 10/2006 | Horne .................... G06F 21/57 726/24 |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |

(56) References Cited

U.S. PATENT DOCUMENTS

| | | |
|---|---|---|
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072324 A1* | 3/2008 | Repasi .................. G06F 21/566 |
| | | 726/23 |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1* | 7/2008 | Traut .................. G06F 9/45533 |
| | | 726/26 |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0043898 A1* | 2/2009 | Xin ........................ H04L 45/00 |
| | | 709/228 |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Proves et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0249277 A1* | 10/2009 | Prakash .................. G06F 8/60 |
| | | 717/100 |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1* | 3/2010 | Hicks .................. G06F 21/563 |
| | | 726/24 |
| 2010/0064044 A1 | 3/2010 | Nonoyama |
| 2010/0077481 A1* | 3/2010 | Polyakov .............. G06F 21/568 |
| | | 726/24 |
| 2010/0083376 A1 | 4/2010 | Pereira et al. |
| 2010/0100718 A1 | 4/2010 | Srinivasan |
| 2010/0115621 A1 | 5/2010 | Staniford et al. |
| 2010/0122343 A1* | 5/2010 | Ghosh .................... G06F 21/55 |
| | | 726/23 |
| 2010/0132038 A1* | 5/2010 | Zaitsev ............... H04L 63/1416 |
| | | 726/22 |
| 2010/0154056 A1* | 6/2010 | Smith .................. G06F 21/564 |
| | | 726/22 |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0251363 A1* | 9/2010 | Todorovic ............... G06F 21/53 |
| | | 726/22 |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2010/0306850 A1* | 12/2010 | Barile .................... G06F 21/577 |
| | | 726/25 |
| 2011/0004737 A1 | 1/2011 | Greenebaum |
| 2011/0025504 A1 | 2/2011 | Lyon et al. |
| 2011/0041179 A1 | 2/2011 | Ståhlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |

(56) References Cited

U.S. PATENT DOCUMENTS

| | | |
|---|---|---|
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupar et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 02/006928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Sun et al., "An automatic anti-anti-VMware technique applicable for multi-stage packed malware," 2008 3rd International Conference on Malicious and Unwanted Software (MALWARE) Year: 2008 | Conference Paper | Publisher: IEEE.*

U.S. Appl. No. 12/571,294, filed Sep. 30, 2009 Final Office Action dated Jan. 2, 2013.

U.S. Appl. No. 12/571,294, filed Sep. 30, 2009 Non-Final Office Action dated Jun. 25, 2012.

U.S. Appl. No. 12/571,294, filed Sep. 30, 2009 Notice of Allowance dated Jun. 2, 2014.

U.S. Appl. No. 13/350,645, filed Jan. 13, 2012 Final Office Action dated Aug. 24, 2012.

U.S. Appl. No. 13/350,645, filed Jan. 13, 2012 Non-Final Office Action dated Mar. 23, 2012.

U.S. Appl. No. 13/350,645, filed Jan. 13, 2012 Notice of Allowance dated Jun. 24, 2014.

Venezia, Paul, "NetDetector Captures Intrusions", InfoWorld Issue 27, ("Venezia"), (Jul. 14, 2003).

(56) References Cited

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al, UCSB, Sep. 2007 https://www.cs.ucsb.edU/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).

(56) References Cited

OTHER PUBLICATIONS

NetBIOS Working Group. Protocol Standard fora NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.--N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

\* cited by examiner

NETWORK-BASED BINARY FILE EXTRACTION AND ANALYSIS FOR MALWARE DETECTION

CROSS-REFERENCE TO RELATED APPLICATIONS

This application is a continuation of U.S. patent Ser. No. 12/571,294 filed Sep. 30, 2009, now U.S. Pat. No. 8,832,829, the entire contents of which are incorporated by reference.

BACKGROUND

Presently, malicious network content (e.g., malicious software or malware) can attack various devices via a communication network. For example, malware may include any program or file that is harmful to a computer user, such as bots, computer viruses, worms, Trojan horses, adware, spyware, or any programming that gathers information about a computer user or otherwise operates without permission.

Adware refers to programs configured to direct advertisements to a computer or a particular user. In one example, adware identifies the computer and/or the user to various websites visited by a browser on the computer. The website may then use the adware to either generate pop-up advertisements or otherwise direct specific advertisements to the user's browser. Spyware refers to programs configured to collect information regarding the user, the computer, and/or a user's network habits. In one example, spyware may collect information regarding the names and types of websites that the user browses and then transmit the information to another computer. Adware and spyware are often added to the user's computer after the user browses to a website that hosts the adware and/or spyware. The user is often unaware that these programs have been added and is similarly unaware of the adware's and/or spyware's function.

Various processes and devices have been employed to prevent the problems that malicious network content can cause. For example, computers often include antivirus scanning software that scans a particular client device for viruses. Computers may also include spyware and/or adware scanning software. The scanning may be performed manually or based on a schedule specified by a user associated with the particular computer, a system administrator, and so forth. Unfortunately, by the time a virus or spyware is detected by the scanning software, some damage on the particular computer or loss of privacy may have already occurred. Additionally, it can take weeks or months for new anti-virus signatures to be manually created and for an anti-virus application to be updated. Moreover, polymorphic exploits are also an issue that limits the effectiveness of some anti-virus applications.

In some instances, malicious network content comprises a bot. A bot is a software robot configured to remotely control all or a portion of a digital device (e.g., a computer) without authorization from the digital device's legitimate owner. Bot-related activities include bot propagation, as well as attacking other computers on a network. Bots commonly propagate by scanning nodes (e.g., computers or other digital devices) available on a network to search for a vulnerable target. When a vulnerable computer is scanned, the bot may install a copy of itself. Once installed, the new bot may continue to seek other computers on a network to infect. A bot may also be propagated by a malicious website configured to exploit vulnerable computers that visit its web pages.

A bot may also, without the authority of the infected computer user, establish a command-and-control (C&C) communication channel to receive instructions. Bots may receive command-and-control communication from a centralized bot server or another infected computer (e.g., via a peer-to-peer (P2P) network established by a bot on the infected computer). When a plurality of bots (i.e., a bot net) act together, the infected computers (i.e., zombies) can perform organized attacks against one or more computers on a network, or assist those engaging in criminal enterprises. In one example, bot infected computers may be directed to flood another computer on a network with excessive traffic in a denial-of-service attack. In another example, upon receiving instructions, one or more bots may direct the infected computer to transmit spam across a network. In a third example, bots may host illegal businesses such as pharmaceutical websites that sell pharmaceuticals without a prescription.

Malicious network content may be distributed over a network via websites, e.g., servers operating on a network according to an HTTP standard. Malicious network content distributed in this manner may be actively downloaded and installed on a user's computer, without the approval or knowledge of the user, simply by accessing the website hosting the malicious network content. The website hosting the malicious network content may be referred to as a malicious web site. The malicious network content may be embedded within data associated with web pages hosted by the malicious website. For example, a web page may include JavaScript code, and malicious network content may be embedded within the JavaScript code. In this example, the malicious network content embedded within the JavaScript code may be obfuscated such that it is not apparent until the JavaScript code is executed that the JavaScript code contains malicious network content. Therefore, the malicious network content may attack or infect a user's computer before detection by antivirus software, firewalls, intrusion detection systems, or the like. Additionally, network traffic may contain malicious binary files, such as, for example, executables.

SUMMARY

Embodiments of the present invention allow for network-based binary file extraction and analysis for malware detection.

In a first claimed embodiment, a method is disclosed for network-based file analysis for malware detection. Network content is received from a network tap. A binary packet is identified in the network content. A binary file, including the binary packet, is extracted from the network content. It is determined whether the extracted binary file is detected to be malware.

In a second claimed embodiment, a system is disclosed for network-based file analysis for malware detection. The system includes a binary identification module configured to receive and identify a binary packet in network content. A binary extraction module is communicatively coupled with the binary identification module and configured to extract a binary file including the identified binary packet from the network content. A malware determination module is configured to determine whether an extracted binary file is detected to be malware.

In a third claimed embodiment, a computer-readable storage medium is disclosed that has stored thereon instructions executable by a processor to perform a method for network-based file analysis for malware detection. The method comprises receiving network content from a network tap; identifying a binary packet in the network content; extracting a binary file including the binary packet from the network content; and determining whether the extracted binary file is detected to be malware.

DETAILED DESCRIPTION

As mentioned herein, network traffic may contain malware. The malware can have the form of malicious binary files, such as, for example, executables. Embodiments according to the present technology relate to a system and method for network-based binary file extraction and analysis for malware detection.

Figure 1:
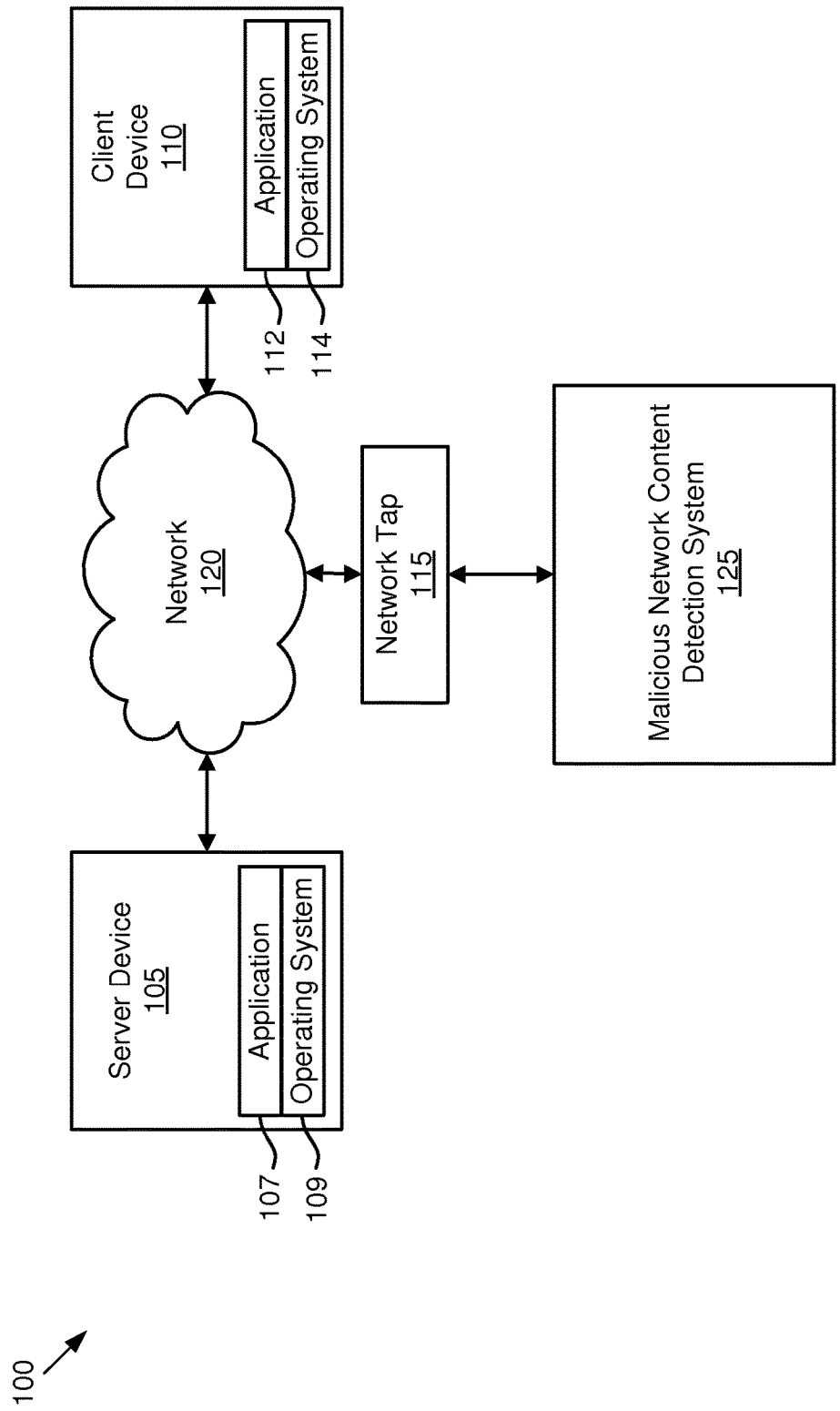
FIG. 1 is a block diagram of an exemplary malicious network content detection environment.

FIG. 1 is a block diagram of an exemplary malicious network content detection environment 100. The environment of FIG. 1 includes server device 105 and client device 110 communicating over network 120. Network tap 115 is also in communication with network 120 and may intercept communications sent over network 120, for example the communications between client device 110 and server device 105. Network tap 115 can generate a copy of the intercepted communications and provide the copied communications to malicious network content detection system 125.

Network 120 may be implemented as the Internet or other WAN, a LAN, intranet, extranet, private network, public network, combination of these, or other network or networks.

Server device 105 provides a network service over network 120. In some embodiments, when network 120 is implemented as the Internet, server 105 can provide a web service. Server device 105 may include one or more applications 107 and run an operating system (OS) 109. In some embodiments, application 107 is a web application providing a web service over network 120. Operating system 109 may be an operating system suitable for use by a server, such as WINDOWS, LINUX, or NOVEL NETWARE operating system.

Client device 110 may execute one or more client applications 112 on operating system 114. In some embodiments, one or more applications on client device 110 may utilize a service provided by server device 105 over network 120. In some embodiments, client device 110 may utilize a web service provided over network 120 by server device 105. Application 112 may be any of several types of applications, such as a browser application, instant messaging application, e-mail application, or another application which can communicate over network 120 or is affected by network content communicated to or from client device 110 over network 120. The network content may include, for example, network data, binary files, executables, etc. Operating system 114 may be any operating system suitable for a client 110, such as WINDOWS, UNIX, or any other suitable operating system.

Malicious network content detection system 125 can communicate with network tap 115 as well as server device 105 and network 120 (communication not illustrated). Network tap 115 may intercept communications between client 110 and server device 105 and communicate a copy of the intercepted communications to malicious network content detection system 125. The intercepted communications can include binary files transmitted to server device 105. Malicious network content detection system 125 can identify, extract, and analyze a binary file contained in network communications between a client device 110 and a server device 105. As part of the processing of network communications, the malicious network content detection system can detect a malicious binary and take steps to minimize the impact of the malicious binary, including initiating blocking of the communication, isolation of the binary, removal of the binary from server device 105, communication to an administrator, and other actions. Malicious network content detection system 125 is discussed in more detail below.

Figure 2:
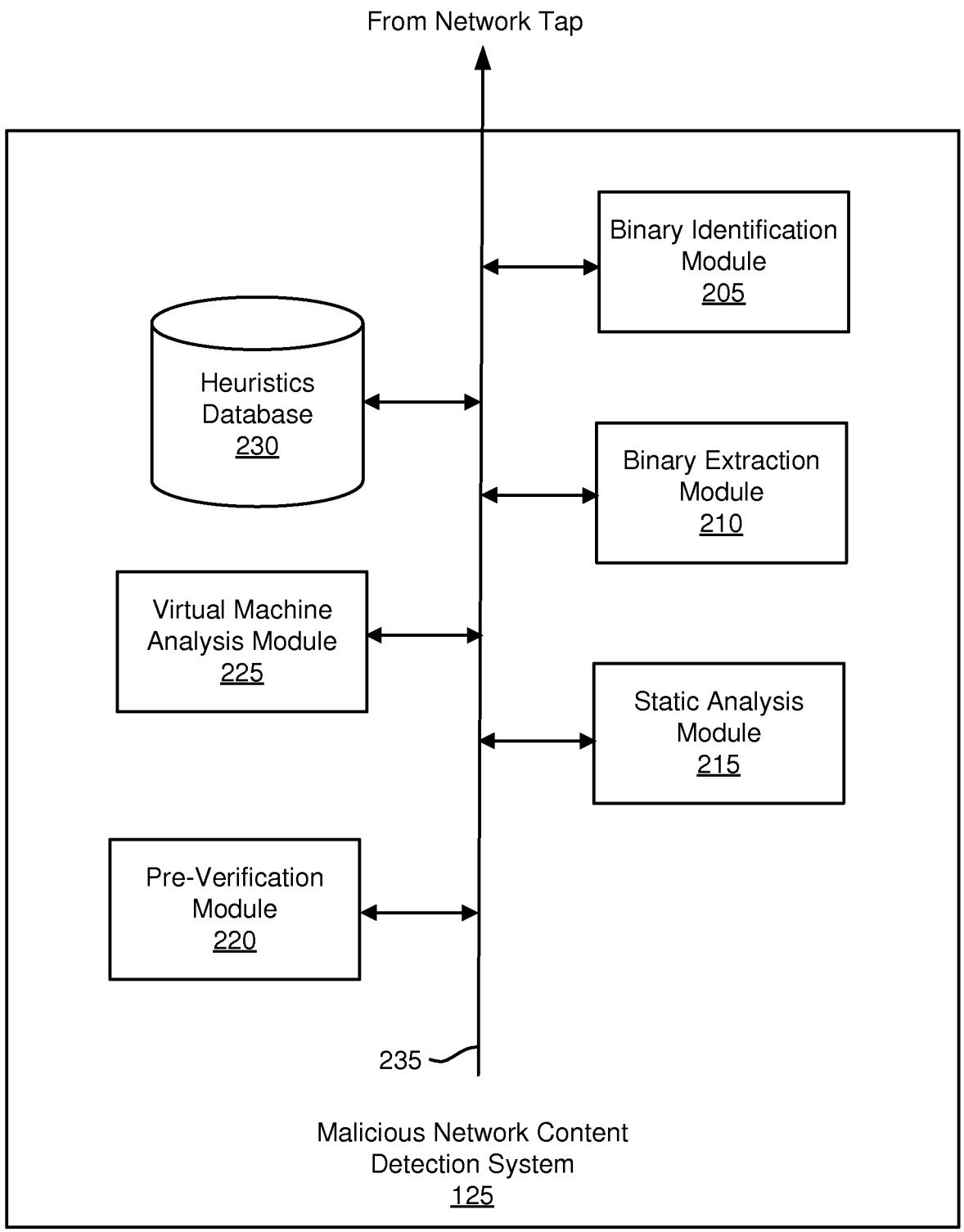
FIG. 2 is a block diagram of an exemplary malicious network content detection system.

FIG. 2 is a block diagram of an exemplary malicious network content detection system 125. Malicious network content detection system 125 includes binary identification module 205, binary extraction module 210, static analysis module 215 (or heuristics module), pre-verification module 220, virtual machine analysis module 225, and heuristics database 230. Each of modules 205, 210, 215, 220, and 225 as well as database 230 can be implemented as one or more programs executed by one or more processors on one or more servers. Each of modules 205, 210, 215, 220, and 225, as well as database 230 can be implemented at least in part hardware. Modules 205, 210, 215, 220, and 225 as well as database 230 can communicate with each other over data bus 235. Data bus 235 may be implemented as one of more general or specific data busses for communicating data, such as, for example, a memory bus, a processor bus, and so forth.

Binary identification module 205 receives network content (e.g., network traffic) via network tap 115. Binary identification module 205 is configured to identify a binary packet in the network content. Binary identification module 205 can identify binary file packets which are multi-protocol and multi-format. For example, binary identification module 205 can identify a binary packet in one of multiple protocols. These protocols can include, for example, STTP, HTTP, SMTP, TFTP, FTP, IMAP, and so forth. Similarly, binary identification module 205 can identify a binary packet in one of multiple formats. These formats can include, for example, Base64, MIME, Gzip (which is a form of compression), and so forth. Binary identification module 205 can identify a binary packet based on different portions of the packet, including packet header data. Binary identification module 205 can also identify encoded and compressed executables by decoding packets using an appropriate decoder and then determining if the decoded content is an (or portion of) executable or not.

Binary extraction module 210 is communicatively coupled with binary identification module 205 and configured to receive intercepted network content from binary identification module 205. Binary extraction module 210 extracts a binary file, which includes binary packets, from the intercepted network content. Binary extraction module 210 can extract binary file packets which are multi-protocol and multi-format. In one embodiment, the binary file extraction is performed before analyzing the binary file to determine if the binary file is detected to be malware. Analyzing the binary file to determine if the binary file is detected to be malware will be described herein.

Malicious network content detection system 125 does not only just search for a raw executable based on the executable headers. The system also searches for encoded executables by first performing decoding and then determining if the decoded content is an executable or not.

In one embodiment, extracting the binary file includes utilizing transmission control protocol (TCP) sequence numbers within the packet to position binary packets in a correct order. This is done because packets belonging to an executable often come out of order. Sometimes, packets of an executable are missing altogether. A user datagram protocol (UDP), or any other suitable protocol, can also be utilized in accordance with embodiments according to the present invention.

Static analysis module 215 is communicatively coupled with binary extraction module 210. The static analysis module 215 can receive an extracted binary (i.e., extracted executable file) from binary extraction module 210. Static analysis module 215 then applies heuristics to the received extracted executable. The heuristics can be retrieved from heuristics database 230. Static analysis module 215 is configured apply heuristics to the extracted binary file to determine if the binary file is suspicious or not. Static analysis module 215 examines heuristics and performs analysis to detect features such as obfuscation, size, etc. Static analysis module 215 is communicatively coupled with heuristics database 230. When application of the heuristics indicates that one or more data packets (such as a binary file) of the network data have a suspicious characteristic or are otherwise suspicious, static analysis module 215 may provide the suspicious binary file to pre-verification module 220.

Pre-verification module 220 can receive a suspicious binary file from static analysis module 215 and compare the binary file against a repository of information associated with known malware binary files to determine if there is a match. The information may include binary file header data, signature data, binary files, and other information. Pre-verification module 220 can compare checksums (hashes, etc.), search for patterns in the network traffic, etc., to determine if there is a match. If pre-verification module 220 detects that a binary file matches a stored malware binary file, the binary file is transmitted to virtual machine analysis module 225 for further processing. If pre-verification module 220 does not detect that a binary file matches a stored malware binary file, virtual machine analysis is then performed on the binary file by the virtual machine analysis module 225, as discussed herein.

An exemplary static analysis module 215 and heuristics database are discussed in more detail in U.S. patent application Ser. No. 12/263,971, filed on Nov. 3, 2008, titled, "Systems and Methods for Detecting Malicious Network Content," which is incorporated by reference herein in its entirety.

Virtual machine analysis module 225 is communicatively coupled with heuristics database 230 and pre-verification module 220. Virtual machine analysis module 225 receives suspicious binary files from pre-verification module 220 and processes the suspicious binary files in a virtual environment. The processing may include executing the suspicious binary files in a virtual operating system to determine if the binary files perform any undesirable actions, operations, or otherwise are determined to be malware. Virtual machine analysis module 225 is discussed in more detail below.

Figure 3:
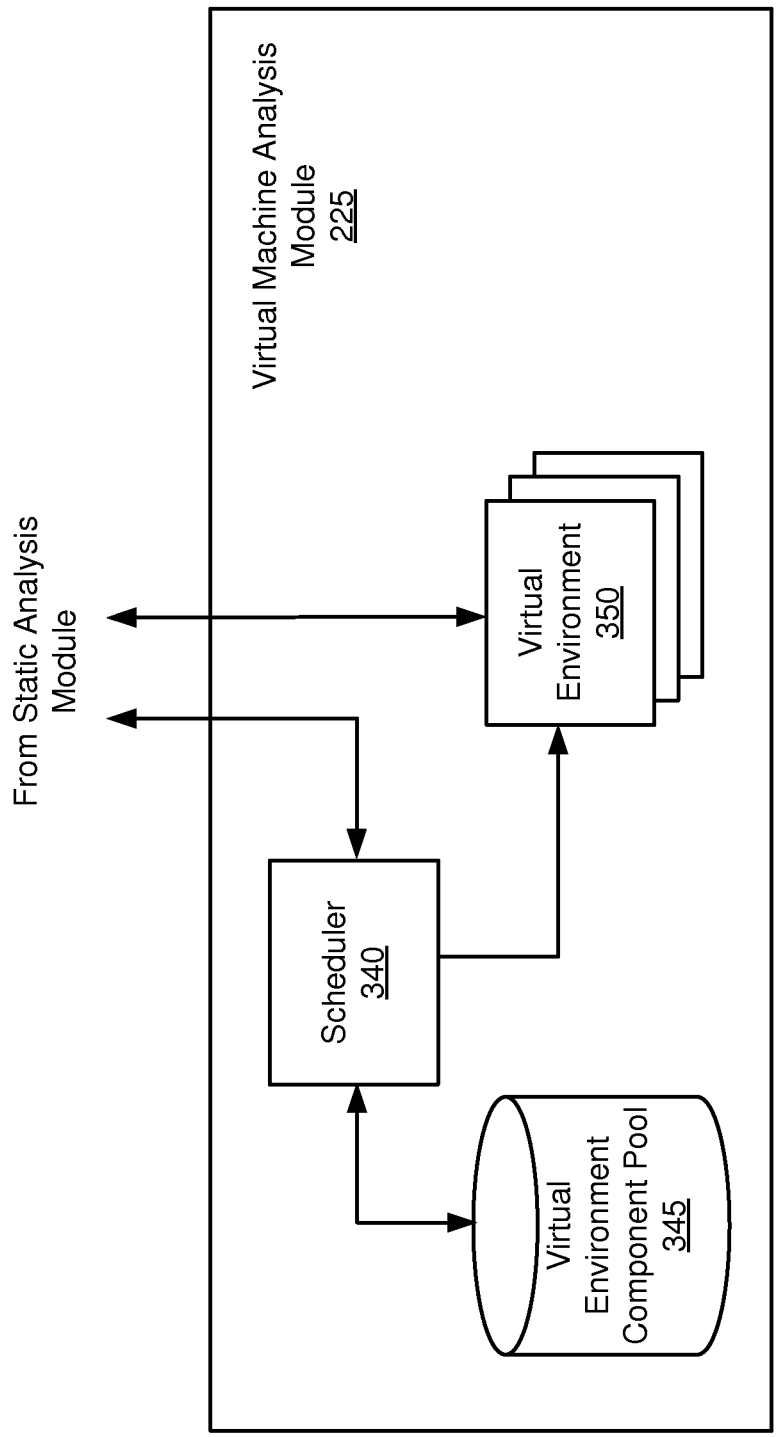
FIG. 3 is a block diagram of an exemplary virtual machine analysis module.

Referring to FIG. 3, virtual machine analysis module 225 is shown in greater detail. Scheduler 340 of virtual machine analysis module 225 can receive a suspicious binary file from static analysis module 215, via pre-verification module 220 (or via static analysis module 215 directly), and replay or execute the binary file in virtual environment 350. In some embodiments, suspicious binary files include data packets that might contain malicious network content such as executable files, for example.

In exemplary embodiments, "replay" of the suspicious network content includes processing the suspicious network content in a virtual environment 350 that is configured to mimic the real environment in which the network content was or was intended to be processed. Configuring the replay of suspicious network content can include retrieving one or more virtual environment components from virtual environment component pool 345, configuring the virtual components, providing the virtual components to virtual environment 350, and executing playback of the suspicious binary file within the virtual environment along with the configured virtual components. For example, a suspicious binary file may be configured to execute within a virtual network browser configured to run on a virtual operating system within virtual environment 350.

Virtual environment component pool 345 contains a pool of different component types, such as applications, operating systems, and other components. Virtual environment 350 is used to replay suspicious network content using one or more virtual components configured to operate virtually within the virtual environment 350. The operation of exemplary embodiments of a scheduler is discussed in more detail in U.S. patent application Ser. No. 12/263,971, filed on Nov. 3, 2008, titled, "Systems and Methods for Detecting Malicious Network Content," which is incorporated by reference herein in its entirety.

Figure 4:
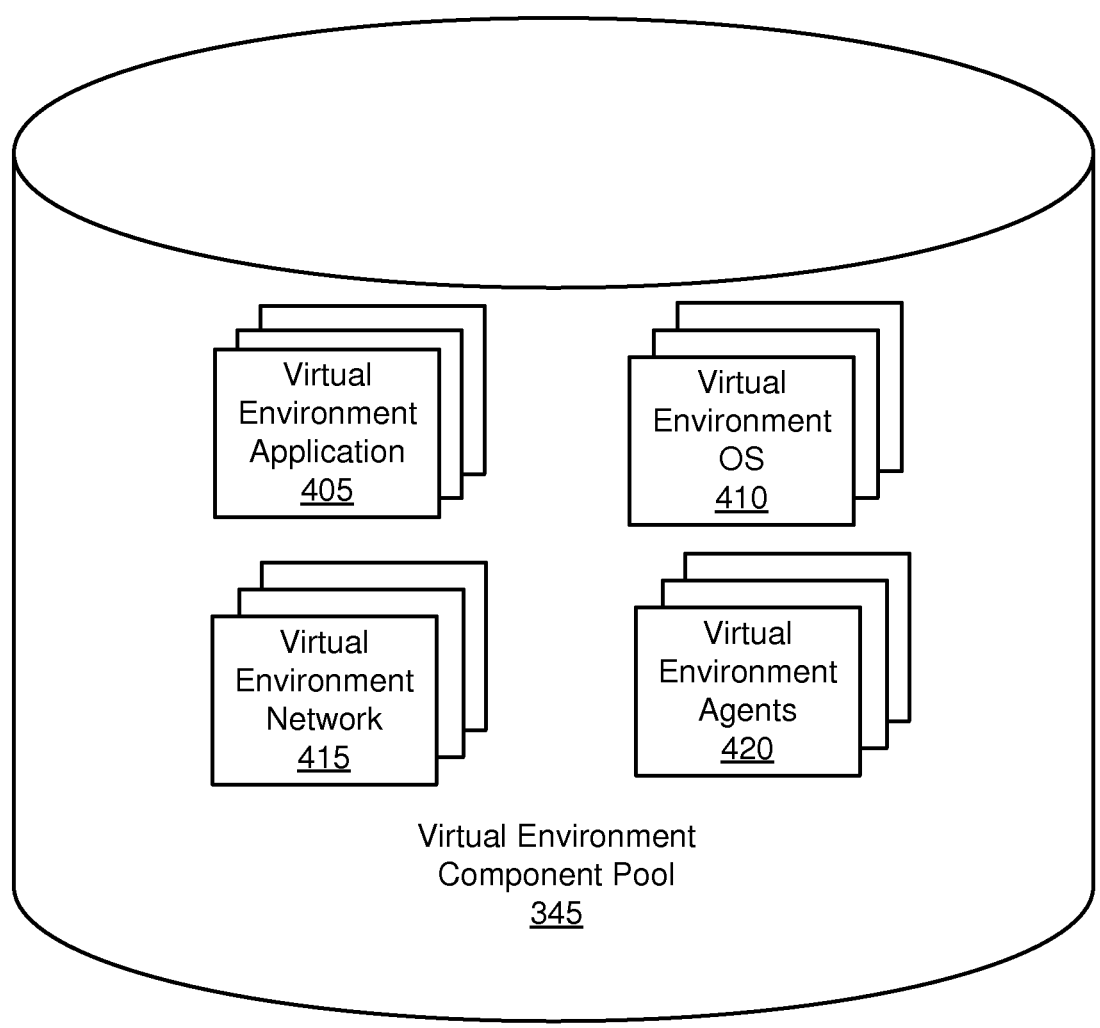
FIG. 4 is a block diagram of an exemplary virtual environment component pool.

Referring to FIG. 4, virtual environment component pool 345 includes virtual environment applications 405, virtual environment operating systems 410, virtual environment networks 415, and virtual environment agents 420. Each of virtual environment applications 405 may be configured to appear and perform as a real application which processes or is affected by network data. Examples of virtual environment applications 405 include a browser application, such as "Internet Explorer" by Microsoft Corporation or "FireFox" by Mozilla, instant messaging applications, client e-mail applications, other applications that process data communicated over a network, and other applications. The virtual environment applications 405 may be implemented as one or more templates of a type of application, or a specific instance of a particular application. The virtual environment applications 405 can be retrieved, configured, and used within one or more virtual environments 350. The behavior of the virtual environment applications 405 can be monitored and compared to an expected behavior to determine whether or not any variances exist which may indicate malicious network content and/or data.

Virtual environment operating system 410 can be implemented to appear and perform as any of several widely known operating systems for computers which process network data, for example WINDOWS, UNIX, or other operating systems. The virtual environment operating system may be configured to mimic a real operating system and monitor to detect attempted changes and actual changes to the operating system which are unexpected.

Virtual environment agent 420 can detect changes in a virtual environment component, such as a virtual environment application 405 or virtual environment operating system 410. In some embodiments, a virtual environment agent 420 may detect changes to a virtual environment component that are not made using a standard process, changes to virtual environment component settings that should not be changed, and other changes to a virtual environment component. For example, virtual environment agent 420 may detect when a change is made to an operating system setting using a non-standard process.

Virtual environment network 415 may be implemented to include a virtual switch, an intranet, the Internet, or some other network. Virtual environment network 415 is configured with protocols that mimic the real network in which the network data is communicated.

Figure 5:
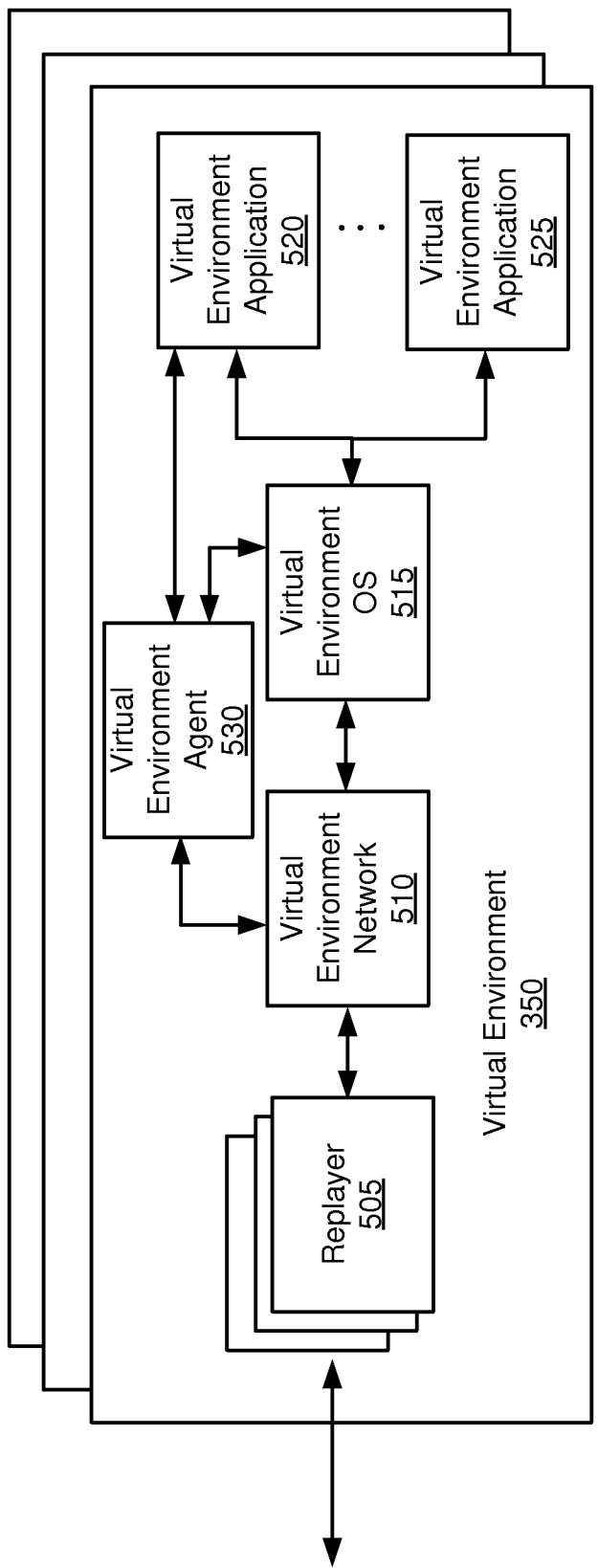
FIG. 5 is a block diagram of an exemplary virtual environment.

FIG. 5 is a block diagram of an exemplary virtual environment 350. Virtual environment 350 includes replayer 505, virtual environment network 510, virtual environment operating system 515, virtual environment applications 520-525, and virtual environment agent 530. Replayer 505 replays network content such as a suspicious binary file in the virtual environment network 510 by receiving and transmitting communications with virtual environment operating system 515 over virtual environment network 510. The communications can be processed by virtual environment operating system 515 as well as by one or more virtual environment applications 520-525.

In some embodiments, suspicious network data such as a suspicious binary file is processed by virtual environment operating system 515 and virtual environment applications 520 and/or 525. Virtual environment network 510 may receive the suspicious binary file from replayer 505 and provide the suspicious binary file to virtual environment operating system 515. Virtual operating system 515 may process the suspicious binary file and optionally provide the suspicious binary file to a virtual environment application. In some embodiments, virtual operating system 515 is configured to mimic a server or server applications, such as server device 105, application 107 or operating system 109.

Virtual environment network 510 may be retrieved from virtual environment component pool 345. The virtual environment network 510 may be implemented as a program to implement a switch or a gateway, or some other software implementation of a network which mimics an actual communications network. In some embodiments, the virtual environment network 510 may process and implement the transmission of data in a manner that simulates the processing and transmission of data by an actual network. In some embodiments, the communications processed through virtual environment network 510 are monitored. In some embodiments, implementing a virtual environment network 510 is optional, in which case replayer 505 communicates with virtual environment operating system 515 directly.

Virtual environment operating system 515 is configured to mimic (e.g., appear and perform in a similar manner as) a real operating system, for example, operating system 114 for client device 110 that processes data over network 120. In some embodiments, virtual environment operating system 515 is implemented as code that emulates an operating system and can interact with one or more virtual environment applications as an actual operating system would. In some embodiments, the virtual environment operating system is implemented as an actual operating system executing within a virtual environment 350.

Virtual environment operating system 515 may communicate data between virtual environment network 510 (or replayer 505) and one or more virtual environment applications. For example, virtual environment operating system 515 may receive requests from a virtual environment application, route the request to replayer 505, and route response data, for example suspicious network content data, from replayer 505 to virtual environment application 520 or 525, respectively. In some embodiments, communications, settings, and other parameters aspects of the behavior of virtual environment operating system 515 within virtual environment 350 are monitored. In some embodiments, virtual environment operating system 515 is optional.

Virtual environment applications 520 and 525 are each configured to behave as an application that processes or is affected by network content on a client computer or server. For example, a virtual environment application may be implemented as code that emulates a real application to mimic the behavior of the real application, for example the behavior of application 112 on client device 110. In some embodiments, a virtual environment application may be implemented as a copy of the actual application which is executed within the virtual environment.

Virtual environment applications can be configured and controlled to replicate the processing of suspicious content data. For example, when replaying suspicious content data, such as a binary executable for example, the virtual environment application can be controlled to submit a request for data over a virtual network. At least a portion of the suspicious content data is transmitted to the virtual environment application in response to the request. Replay of suspicious network data continues until the content data has been replayed in its entirety. The communications, settings, and other aspects of the behavior of virtual environment applications within virtual environment 350 can be monitored.

One or more virtual environment agents 530 can be configured to monitor the behavior and/or state of one or more virtual environment components. In some embodiments, virtual environment component behavior can include requests for data, sending or receiving data over a network, processing and/or storing data, or other operations performed on the component. In some embodiments, the virtual environment component state may include a "snapshot" of the virtual environment parameters and settings, for example values for components settings, status of a portion component portion (i.e., error conditions, interrupts, availability of a buffer), or values for settings or parameters for the component. For example, virtual environment agent 530 can monitor changes made to virtual environment operating system 515. In some embodiments, if a setting is changed to an improper value or an improper procedure is used to change a setting to the operating system, the virtual environment agent 530 can detect the code associated with suspicious network content which performed the change.

In addition to the network, operating system, application, and agent components illustrated in virtual environment 350, other types of virtual environment components can be used within virtual environment 350 to process suspicious network data. For example, virtual environment 350 may include virtual environment hardware to mimic a hardware protocol, ports, or other behavior of an actual hardware machine.

Exemplary methods discussed herein relate to detecting and processing malicious network content. Examples are occasionally discussed which relate to virtual environment components comprising a browser application and an operating system. These exemplary references are for purposes of discussion only and are not intended to limit the scope of the present technology.

Figure 6:
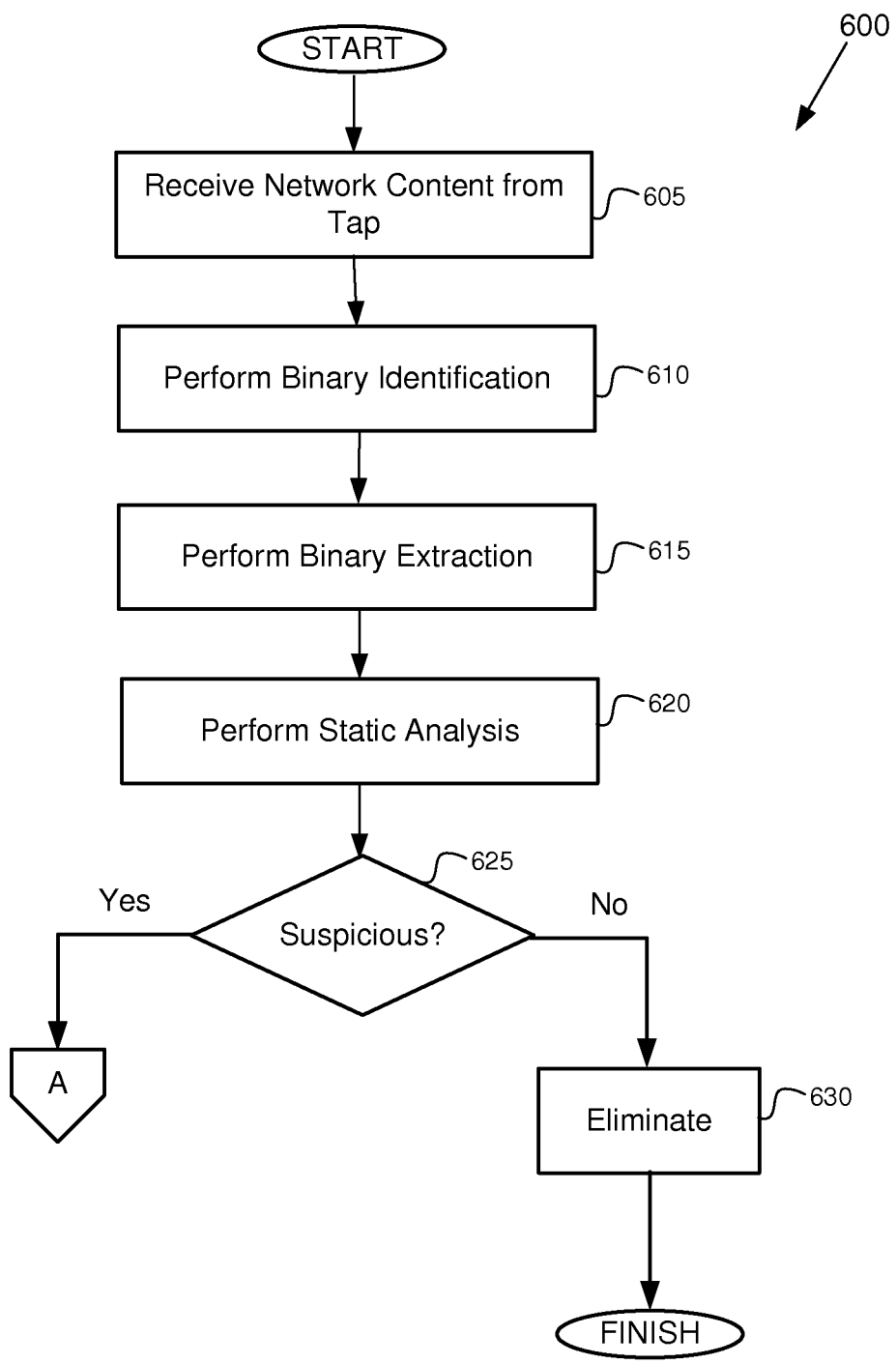
FIG. 6 is a flowchart of an exemplary method for network-based file analysis for malware detection.

FIG. 6 is a flow chart 600 of an exemplary method for network-based file analysis for malware detection. In step 605, malicious network content detection system 125 receives network content (e.g., network traffic) from network 120 via network tap 115. More specifically, in one embodiment, binary identification module 205 receives a copy of network content from network tap 115.

In step 610, binary identification module 205 identifies a binary packet in the network content. As mentioned herein, binary identification module 205 can identify a binary packet in multiple protocols and multiple formats. In some embodiments, several binary packets may be identified at step 610, each of which is forwarded to binary extraction module 210.

In step 615, binary extraction module 210 receives intercepted network content from binary identification module 205. Binary extraction module 210 extracts a binary file, which includes binary packets, from the network content identified as one or more binary packets by binary identification module 205. Binary extraction module 210 can extract binary file packets which are multi-protocol and multi-format.

However, data packets are often encountered out of order. Furthermore, all of the data packets of a given executable might not arrive in an unbroken chain. In other words, data packets that are not part of the executable in question might intervene. Data packets can also be missing altogether. Binary extraction module 210 can use, for example, TCP sequence numbers in order to put binary packets in a correct order until a binary file is constructed and thus extracted. In other words, binary extraction module 210 may remove the identified packets and place them into a binary file in the order they were intended.

In step 620, static analysis is performed on the binary file which comprises one or more extracted binary packets. Static analysis module 215 receives an extracted binary file from binary extraction module 210. Static analysis module 215 then applies heuristics to the binary file to determine if the binary file is suspicious. Static analysis module 215 searches for indicia such as obfuscation, size, etc. Static analysis module 215 accesses heuristics data from heuristics database 230 to facilitate the analysis.

Figure 7:
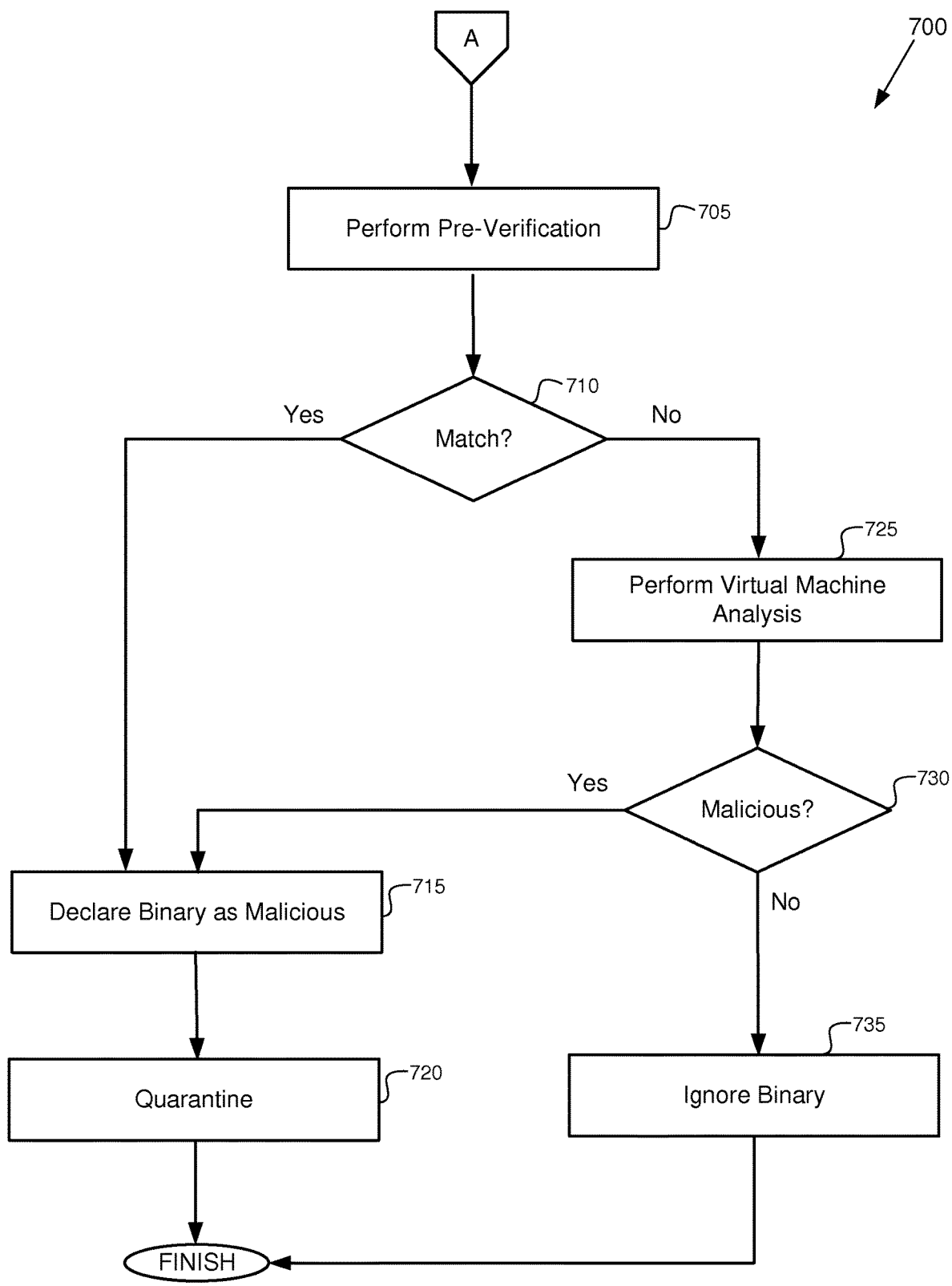
FIG. 7 is a flowchart of an exemplary method for network-based file analysis for malware detection.

In step 625, when examination of the heuristics indicates that one or more binary data packets (one or more packets from the extracted binary file) of the network data have a suspicious characteristic or are otherwise suspicious, static analysis module 215 provides the suspicious binary file to pre-verification module 220 and the process proceeds to step 705 of FIG. 7.

If the binary file does not appear to be suspicious, then the process proceeds to step 630. In step 630, the binary file is eliminated as possible malware. Static analysis module 215 performs a pre-evaluation process to identify suspicious packets and binary files having suspicious packets which require more in-depth processing while eliminating binary files and packets that do not need to be analyzed further. By eliminating packets and binary files that do not need to by analyzed further, the static analysis module 215 saves processing cycles when compared to prior art methods that completely analyze all binary packets and files.

Referring to FIG. 7, a flowchart 700 is depicted of an exemplary method for network-based file analysis for malware detection. In step 705, pre-verification is performed by pre-verification module 220. In this phase, the suspicious binary file identified by static analysis module 215 is compared to binary files contained in a pre-verification database (not depicted) of known malicious binary files to determine if there is a match for the suspicious binary file. Various techniques can be utilized to determine a match, such as calculating checksums, searching for patterns, etc. The pre-verification database can be located within malicious network content detection system 125. In one embodiment, the pre-verification database is a standalone database. However, it is also contemplated that the pre-verification database can be a part of pre-verification module 220, part of one of the other modules, or part of heuristics database 235. In step 710, if there the pre-verification database includes a match for the suspicious binary file, the process proceeds to step 715. If there is no match then the process proceeds to step 725.

In step 715, it has been determined that the binary file matches with known malware, and the binary file is declared as malicious. In step 720, the binary file is placed under quarantine. In this step, the binary file is isolated from client device 110 so that the binary file cannot inflict any damage. Other actions can also be performed based on the determination that the suspicious malware is actually malware.

In step 725, the binary file is received by virtual machine analysis module 225. Virtual machine analysis is then performed on the binary file by the virtual machine analysis module 225, as discussed herein, in order to determine if the binary file in question is malicious. Various behavior and activities of the binary file within a configured virtual environment are monitored in order to detect any suspicious behavior or activity. The monitoring can include attempted CPU instrumentation by the suspicious binary file, network behavior anomalies, network pattern matches, operating system behavior, data theft, key logging, startup, file registry process, code injection, changes to files, changes to registry keys, changes to processes, processes trying to launch themselves, initiation of processes trying to "hook" themselves into the startup mechanisms of an operating system, such as a WINDOWS operating system, so that on reboot the suspicious binary file will start automatically, processes trying to perform actions such as kill firewalls or kill anti-virus software to protect themselves, and so forth.

Suspicious network content can be detected by static analysis module 215 as static analysis module 215 applies heuristics to the network content provided by binary extraction module 210. For example, if a heuristic applied by static analysis module 215 identifies a suspicious characteristic in the network content, then the network content is considered suspicious. Exemplary methods for detecting suspicious network content using heuristics and other methods are disclosed in U.S. patent application Ser. No. 12/263,971, filed on Nov. 3, 2008, titled, "Systems and Methods for Detecting Malicious Network Content," which is incorporated by reference herein in its entirety.

The suspicious network content may include data packets containing suspicious characteristics as well as related data packets. For example, suspicious network content may include data packets comprising the request which resulted in a response having a suspicious characteristic as well as additional data retrieved by the code containing the suspicious characteristic. The suspicious network content may include binary files and/or executables.

Suspicious network content is replayed using the virtual environment components. The suspicious network content is replayed within virtual environment 350 by replayer 505. In some embodiments, replaying virtual network content includes processing the suspicious network data by one or more virtual environment components within virtual environment 350. For example with respect to web page content having suspicious content, replayer 505 transmits the suspicious network content containing the suspicious characteristic to be processed by a virtual environment operating system and virtual environment browser application. The actual network content copied is provided to the one or more of the virtual environment components.

After replaying the suspicious network content, the virtual environment components are analyzed to detect malicious network content. In some embodiments, each virtual environment component is associated with an expected behavior. The expected behavior for a component is compared to the behavior observed for the virtual environment component as the component processed the suspicious network content. If there was a difference between the observed behavior and the expected behavior, the suspicious network content is determined to be malicious network content.

After detecting malicious network content, the malicious network content is identified and processed. In some embodiments, an identifier is created for the malicious network content and further processing is performed to minimize damage resulting from the malicious network content. The further processing may include blocking subsequent network data that resembles the identified malicious network content, removing the malicious network content from one or more clients within a computer network, and other processing.

An exemplary method for configuring virtual environment components includes identifying components in a live environment. The components may be identified on client device 110, server device 105, or some other machine (real or virtual) or environment that processes or is affected by network data communicated over network 120. The identification can be performed by scheduler 340 based on information in network data, a reporting server with information for one or more computers exposed to the network content (e.g., computers that transmit or receive the suspicious content), data stored locally on malicious network content detection system 125, or from some other source. Examples of real environment components include a browser application, electronic messaging client, instant messaging client, an operating system, some other software or hardware on a machine that accesses network content, etc.

Scheduler 340 performs various tasks, as described herein. Virtual environment components are retrieved for the identified real environment components by scheduler 340. The virtual environment component can be associated with types of applications, operating systems, or other code that can be executed in a real environment. The components can be retrieved by scheduler 340 from virtual environment component pool 345.

The one or more virtual environment components may be configured to mimic a real environment application at. Scheduler 340 can configure the component to mimic the appearance and behavior of the real environment application. The configuration can be such that any suspicious code will not be able to detect a difference between the real component and the virtual environment component application. For example, a virtual environment network application 415 can be configured as Microsoft's "Internet Explorer" or Mozilla's "Firefox" browser application, wherein the component is configured with protocols, user preferences, proxy addresses, encryption preferences, add-in code, and other settings that can correspond to an actual browser application executing on client device 110.

In some embodiments, rather than execute code that mimics the application, a copy of the actual application is executed within the virtual environment. Thus, the application is executed within a virtual operating system, configured with settings and parameters associated with a real application.

Virtual environment components can be configured to mimic a real environment operating system. The virtual environment operating system may be configured to mimic an operating system used to process network data communicated over network 120 by server device 105 or client device 110. For example, the component can be configured to mimic Microsoft's "Windows" operating system. The configuration may include setting a number of port addresses, settings, and other data.

Virtual environment components may then be configured to mimic the real environment network. Configuring a virtual environment component network may involve setting up protocols, and other features to mimic network 120. In some embodiments, the network may be configured as a virtual switch, relay station, or some other network system for relaying content data.

Virtual environment agents are retrieved and configured. A virtual environment agent can be implemented as code which monitors component behavior and settings in a virtual environment. The virtual environment agents may detect behaviors and changed settings as they occur and may detect whether the behaviors or setting changes are expected or unexpected. If unexpected, the suspicious network content which implemented or caused the change is identified as malicious.

In some embodiments, a virtual machine hardware component may be configured as well. In this case, the virtual machine hardware may be configured to mimic real hardware ports, settings, and other aspects of the actual hardware used to implement an operating system and application components.

An example regarding replaying network content using a browser application is considered herein. An initial request is replayed from a virtual environment application to a virtual environment operating system. In some embodiments, the initial request is configured based on network content (for example, consisting of network data packets) copied by network tap 115. For example, network content may be stored for period of time. When one or more network content data packets are determined to be suspicious, all network content associated with the suspicious data packets are retrieved and replayed. For example, network content provided to a network browser application in response to a request may contain suspicious data packets. Once data packets in the response are determined to be suspicious, the request which generated the response as well as other communications occurring after the response was received all retrieved in their entirety.

In some embodiments, the initial request is configured by replayer 505 or scheduler 340 and sent from virtual environment application 520 to replayer 505. Transmission of the initial request can result in virtual environment application behavior corresponding to the request. For example, for a network browser application, the request may initiate creating of a cookie associated with the request. The cookie can include a timestamp for and an identifier associated with the request, as well as creation of other data.

Suspicious network content is provided to a requesting virtual environment application. In response to the initial request, the network content is transmitted to the virtual environment application to replicate transmission of the network content to the requesting client in a real computing environment. For example, in reply to an HTTP request, the response may include HTTP packets, image data packets, and other content comprising a response to the request. The data packets comprising the response are transmitted to virtual operating system 515 by replayer 505 over virtual environment network 510. Virtual operating system 515 receives the content data, optionally processes the data, determines which virtual environment application will receive the data, and "transmits" the content data to the virtual environment application. For a virtual network browser application, the content data is transmitted to the browser application to be loaded as a web page or other content.

In some embodiments, the network content is not provided to a virtual environment operating system, but rather directly to the virtual environment application.

The suspicious network content is then processed by the virtual environment application. For example, a virtual environment browser application may load web page data and image data, execute a script, or provide flash video as included in the response data packets.

When the received network content contains code that is malicious (although it may not yet be identified as malicious before it is executed), the content is processed by the virtual environment application just as it would be when the network content and malicious code would be executed by a real application. For example, malicious content may include binary code that includes an executable. When executed by the virtual environment browser application, the executable code may attempt to transmit a message to a server, retrieve data within the local environment, change a setting in the virtual environment browser application, or perform some other operation as mentioned herein.

While processing the suspicious network content, the virtual environment application, operating system, network and other virtual environment components are monitored by one or more virtual environment agents 530. As suspicious network data is "replayed" by processing the network data by the virtual environment components, the behavior of each component can be detected, logged, stored, reported and/or otherwise monitored by an agent. One agent may monitor a single component or multiple components.

For example, a virtual environment agent may detect behavior in a virtual environment browser application. When the virtual environment browser receives and processes suspicious content data, the browser application may execute executable code within the data. The executable code may attempt to transmit a message over the virtual network (i.e., to replayer 505) improperly. For example, the executable may attempt to send a message directly to a server instead of using a proxy address specified by the virtual environment browser application. A virtual environment agent monitoring the browser application may detect all requests sent by the virtual browser application, and thereby detect the improper request which did not go to the proxy address.

A virtual environment agent may also detect changes to an operating system which are improper. For example, when executed by a virtual environment application, an executable or other code in received network content may change or attempt to change an operating system setting, value, or otherwise change the virtual environment operating system. The virtual environment agent may detect the change or attempted change by intercepting or monitoring all changes to the virtual environment operating system. As another example, the operating system may receive data to be stored.

The data may comprise an executable, which may attempt to access information, control an application, or perform some other function. When data received by the operating system for storage is an executable or other executable code, the execution of the data is monitored by the agent to determine the effects of the data execution.

When monitoring data, a virtual environment agent may record information regarding the effects and identification of the suspicious network data when the data is being processed in the virtual environment. For example, the virtual environment agent may identify application and operating system settings and values affected by the suspicious network content, values before and after they are affected during processing of the suspicious network content, changes to processes such as an operating system "start-up" process, and other changes. The virtual environment agent may also identify a request made by the suspicious network content, including requests to transmit data over a network, requests for local data access, and other requests. This and other data may be stored and/or reported by the virtual environment agent for later processing.

Analyzing virtual environment components to detect malicious network content can be performed by scheduler 340. In one embodiment, expected behavior for a virtual environment component such as an application, operating system and/or network is accessed. The expected behavior data can be determined from stored behavior patterns associated with each component. The behavior patterns may be accessed locally or remotely by scheduler 340. For example, a stored behavior pattern for a virtual environment network browser can indicate that all requests to transmit over a network should be directed towards a proxy address specified by the virtual environment network browser. A stored behavior pattern for an operating system can indicate parameter values that should not be changed as well as code that should be invoked when attempting to change a particular parameter.

The actual behavior pattern of the virtual environment application or operating system is then compared with the expected behavior pattern for the application or operating system. The actual behavior may be retrieved from data stored by one or more virtual environment agents 530. For example, the expected behavior for transmitting a request by a virtual environment network browser can include sending a content request to a proxy address set within the network browser settings. The actual behavior may include a content request initiated by executable binary code in the suspicious network content that attempts to transmit a network request directly.

If a difference is detected between the actual behavior and expected behavior then the suspicious network content is identified and processed as malicious network content. In some embodiments, the suspicious network data is flagged to be identified and processed later.

After identifying and processing the malicious network content, or if no difference is detected between the actual behavior and expected behavior, the actual behavior for a virtual environment operating system is compared to the expected behavior for the virtual environment operating system. For example, the expected behavior may involve a particular process changing an operating system parameter value, when the actual behavior may attempt to change the operating system parameter value without using the particular process. The actual behavior may involve an attempt to change the settings by code executed by an application. If any difference is detected between the actual behavior and the expected behavior for the virtual environment operating system, the suspicious network data associated with the actual behavior is identified and processed as malicious network content.

The actual behavior is compared with expected behavior for a virtual environment network. If any difference is detected between the actual behavior and the expected behavior, the network data associated with the behavior is identified and processed as malicious network content. If no difference is detected, the suspicious network data is not identified as malicious network content.

In some embodiments, scheduler 340 can detect malicious content from the behavior of a virtual environment application, virtual environment operating system, or virtual environment network "on the fly" or instantly during replay of the suspicious content in the virtual environment rather than waiting until suspicious content replay has been completed. As suspicious content is replayed, scheduler 340 may compare each incremental behavior of a virtual environment application, operating system, or network to the corresponding next expected incremental behavior. If the next actual incremental behavior does not match the next expected incremental behavior, the suspicious content responsible for the actual behavior is immediately identified as malicious network content and the malicious network content is processed. By comparing the expected behavior and actual behavior during replay rather than after replay has completed, malicious network content can be identified during the replay of the suspicious content (i.e., "on the fly") and subsequent occurrences of the malicious network content can be detected more quickly.

More detail regarding identifying and processing malicious network content is described herein. First, an identifier is created for malicious network content. The identifier may be generated at least in part based on information within the malicious network data.

Network content data associated with malicious network content is then collected. The collected network content data associated with the malicious network content may include the data packets that include the identified malicious network content, code retrieved by the malicious network content, source information that provided the malicious network content, and other data.

After collecting network content data, a heuristic is generated to identify the subsequent malicious network content associated with the malicious content data. The heuristic is generated such that it may identify network data copied and provided by network tap 115. In some embodiments, the heuristic is a signature of the network content data. In some embodiments, the signature can include or be derived from data packets comprising the malicious network data, an identification of the application that processed the malicious data, a byte sequence of the malicious data, and other data that is capable of identifying the malicious network data within a stream of network data received over a network.

The generated heuristic is then provided to static analysis module 215 within malicious network content detection system 125. Once provided to static analysis module 215, the static analysis module 215 may apply the heuristic to network data retrieved by network tap 115 and provided to malicious network content detection system 125.

In some embodiments, a signature may be generated immediately upon detecting the malicious network content, such that the signature can be applied to subsequent network content with minimal delay. Generating and applying the signature immediately against subsequent network content enables the present system to provide real-time detection and protection against malicious network content. For example, if a virtual environment agent 420 detects that network content improperly changes a virtual environment operating system setting, the agent, scheduler, or heuristic module (or a combination of these) may generate a signature for the corresponding network content. The heuristic module may then apply the signature to subsequent network traffic copied by network tap 115. If any network content in subsequent network traffic matches the signature, the subsequent network traffic can be blocked or otherwise contained without affecting client device 110.

In addition to providing heuristics against subsequent or future malicious network content, measures may be taken to remove the malicious network content from computing systems which have already been infected by the content. Script code is created for disinfecting live environment components. The script code is generated for the purpose of restoring a real environment component from damage caused by the malicious network content. The created script code is then distributed and executed among computers suspected of receiving the malicious network content.

Virtual environment components and the like are discussed in more detail in U.S. patent application Ser. No. 12/359,252, filed on Jan. 23, 2009, titled, "Detecting Malicious Network Content Using Virtual Environment Components," which is incorporated by reference herein in its entirety.

In step 730, a determination is made as to whether the binary file has been detected to be malicious (e.g. malware). If the binary file has been detected to be malicious then the process proceeds to step 715. If the binary file has not been detected to be malicious then the process proceeds to step 735. In step 735, the binary file is ignored since a determination has been made that it is not malicious.

Figure 8:
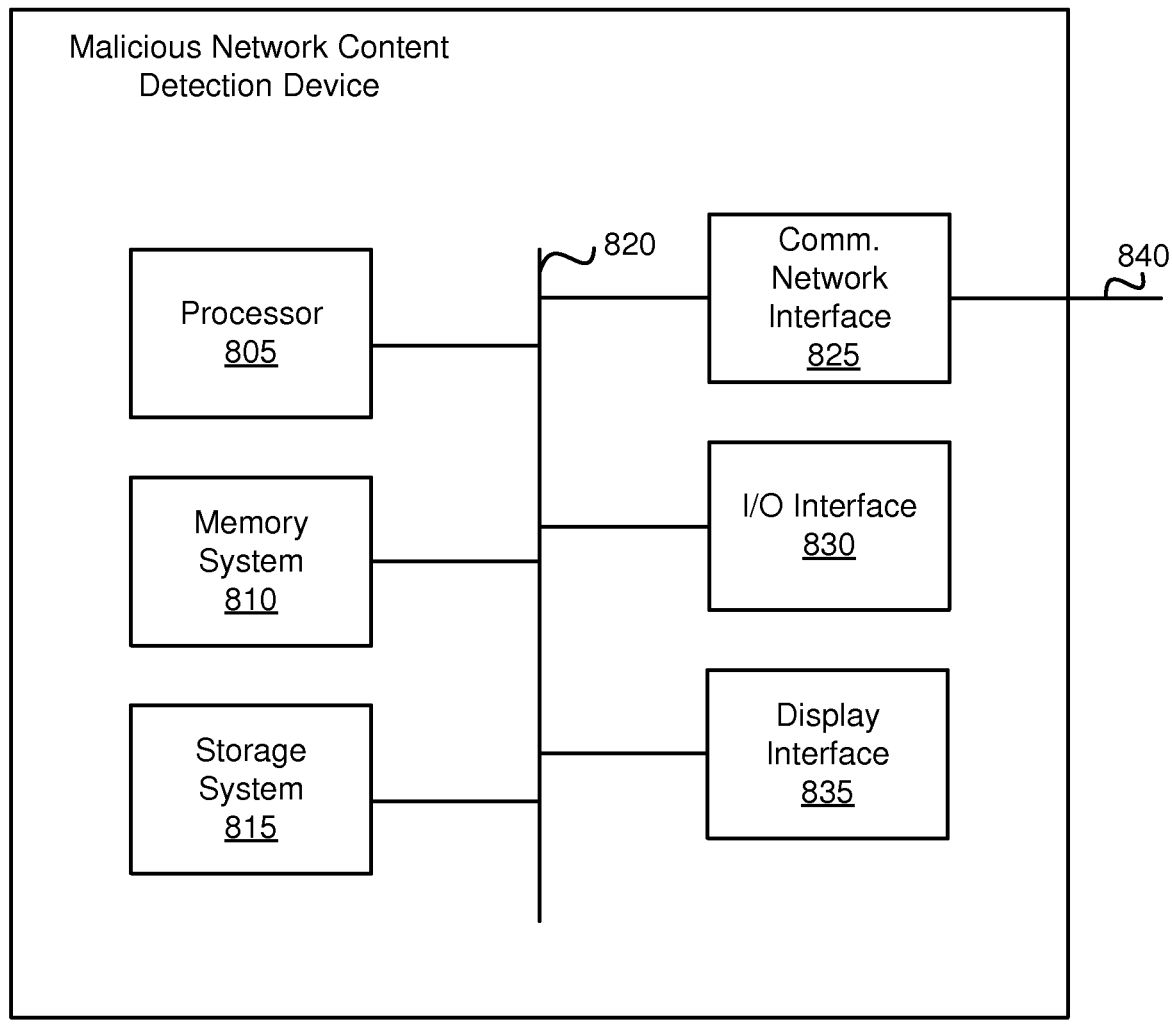
FIG. 8 is a block diagram of an exemplary malicious network content detection device.

FIG. 8 is a block diagram of an exemplary malicious network content detection device. In some embodiments, the method of FIG. 8 provides more detail for malicious network content detection system 125 of FIG. 1. Malicious network content detection system 125 comprises at least one or more processors 805, memory systems 810, and storage systems 815, each of which can be communicatively coupled with data bus 820. In some embodiments, data bus 820 may be implemented as one or more data buses. Malicious network content detection system 125 may also comprise communication network interface 825, input/output (I/O) interface 830, and display interface 835. Communication network interface 825 may be communicatively coupled with network 120 via communication medium 840. In some embodiments, malicious network content detection system 125 may be communicatively coupled with a network tap, such as network tap 115, which in turn may be communicatively coupled with network 120. Bus 920 provides communications between communications network interface 825, processor 805, memory system 810, storage system 815, I/O interface 830, and display interface 835.

Communications network interface 825 may communicate with other digital devices (not shown) via communications medium 840. Processor 905 executes instructions which may be stored on a processor-readable storage medium. Memory system 810 may store data permanently or temporarily. Some examples of memory system 810 include RAM and ROM. Storage system 815 also permanently or temporarily stores data. Some examples of storage system 815 are hard discs and disc drives. I/O interface 830 may include any device that can receive input and provide output to a user. I/O interface 830 may include, but is not limited to, a keyboard, a mouse, a touch screen, a keypad, a biosensor, a compact disc (CD) drive, a digital video disc (DVD) drive, an optical disk drive, or a floppy disk drive. Display interface 835 may include an interface configured to support a display, monitor, or screen. In some embodiments, malicious network content detection system 125 comprises a graphical user interface to be displayed to a user over a monitor in order to allow the user to control malicious network content detection system 125.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for detecting malware as performed by a detection system, the method comprising:
    detecting a binary file within content received over a network, the binary file includes executable content;
    extracting the binary file from the received content;
    determining whether the binary file includes malicious content by comparing the binary file to information contained in a storage element including stored, known malware binary files, and upon classifying the binary file as malicious content based on a comparison of the binary file to a malware binary file of the known malware binary files, conducting operations to minimize impact on the system by the binary file by at least (i) initiating blocking of a transfer of the received content including the binary file, (ii) isolating the binary file from portions of the received content, or (iii) removing the binary file; and
    responsive to failing to classify the binary file as malicious content based on a prior determination that information associated with the binary fails to compare to information contained in the storage element including the stored, known malware binary files,
        executing the executable content of the binary file using a virtual environment component that performs operations of a software component, the software component comprises either (i) an application or (ii) an operating system,
        identifying the executable content of the binary file as malicious content based on identifying one or more behaviors produced by the virtual environment component during execution of the executable content of the binary file by at least examining the one or more behaviors of the virtual environment component against one or more expected behaviors, and
        responsive to detecting malicious content, conducting operations to minimize impact of the malicious content by at least (i) initiating blocking of communications including the binary file or (ii) removing the binary file from the communications.

2. The method of claim 1, wherein the expected behaviors are determined from a plurality of behavior patterns that are stored locally within the detection system or remotely from the detection system, a first behavior pattern of the plurality of behavior patterns representing that a request transmitted over a network is directed to a proxy address specified by a browser application of the virtual environment component.

3. The method of claim 1, wherein the expected behaviors are determined from a plurality of behavior patterns that are stored locally within the detection system or remotely from the detection system and the examining of the one or more behaviors of the executable content against the expected behaviors comprises determining whether a difference is detected between the one or more behaviors produced by the virtual environment component during execution of the executable content of the binary file and a behavior pattern of the plurality of behavior patterns associated with the virtual environment component, the behavior pattern of the plurality of behavior patterns representing one or more parameters of an operating system that should not be altered.

4. The method of claim 3, wherein the examining of the one or more behaviors of the virtual environment component against the expected behaviors comprises
    determining whether a difference is detected between the one or more behaviors produced by the virtual environment component during execution of the executable content of the binary file and a behavior pattern of the expected behaviors, the difference identifying the executable content of the binary file as malicious content when the one or more behaviors correspond to the behavior pattern that represents that no changes in a particular operating system setting is to be performed by the executable content being executed by the virtual environment component operating as the software component and the one or more behaviors identify that a change in the particular operating system setting is attempted by the virtual environment component.

5. The method of claim 1, wherein the examining of the one or more behaviors of the virtual environment component against the expected behaviors comprises
    determining whether a difference is detected between the one or more behaviors produced by the virtual environment component during execution of the executable content of the binary file and a behavior pattern of the expected behavior patterns associated with the virtual environment component, the difference being detected when the one or more behaviors represent a particular process authorized to change an operating system parameter and the one or more behaviors identifies the content of the binary file as malicious content when a process other than the particular process changes the operating system parameter.

6. The method of claim 1, wherein prior to determining whether the binary file includes malicious content, the method further comprising:
    classifying, by a static analysis module, the binary file as suspicious content or non-suspicious content, wherein the suspicious content includes a suspicious characteristic related to malicious content; and
    upon classifying the binary file as non-suspicious content, discontinuing further analysis of the binary file.

7. The method of claim 6, wherein the classifying of the binary file as suspicious content or non-suspicious content comprises performing a static analysis based on heuristics on the binary file.

8. The method of claim 6, wherein the classifying of the binary file as suspicious content or non-suspicious content comprises determining whether content within the binary file is obfuscated.

9. The method of claim 6, wherein the classifying of the binary file as suspicious content occurs when (i) the binary file has a suspicious characteristic related to malicious content and (ii) the binary file fails to match a known malware binary file.

10. The method of claim 6, wherein the classifying of the binary file is conducted by a static analysis module executed by one or more processors implemented within the system.

11. The method of claim 6, wherein the determining whether the binary file includes malicious content is conducted in response to classifying the binary file as suspicious content.

12. The method of claim 1, wherein the virtual environment component comprises a virtual environment operating system that performs operations that correspond to operations conducted by an operating system, where the identifying of the executable content of the binary file as malicious includes detecting at least an attempted change to an operating system setting.

13. The method of claim 1, wherein the extracting of the binary file, executing the executable content of the binary file, and identifying the executable content as malicious content are conducted automatically without user intervention.

14. The method of claim 1, wherein the virtual environment component performs operations of the software component that operates as a browser application.

15. A method conducted by a detection system for detecting malware, the method comprising:
    detecting a binary file within content received over a network, the binary file includes executable content;
    extracting the binary file from the received content;
    classifying, by a static analysis module, whether the binary file is either (i) suspicious content representing that the binary file potentially includes malicious content or (ii) non-suspicious content;
    upon classifying the binary file as non-suspicious content, discontinuing further analysis of the binary file;
    upon classifying the binary file as suspicious content, determining whether the binary file includes malicious content by comparing the binary file to information contained in a storage element including stored, known malware binary files, and upon classifying the binary file as malicious content, based on a comparison of the binary file to a malware binary file of the known malware binary files, conducting operations to minimize impact on the system by the binary file by removing the binary file; and
    responsive to failing to classify the binary file as malicious content after comparing the binary file to the information contained in the storage element including the stored, known malware binary files,
        executing the executable content of the binary file using a virtual environment component that performs operations of a software component, the software component comprises either (i) an application or (ii) an operating system,
        identifying the executable content of the binary file as malicious content based on identifying a difference between one or more behaviors during execution of the executable content of the binary file and one or more expected behaviors, and
        responsive to detecting malicious content, conducting operations to minimize impact of the malicious content by at least (i) initiating blocking of communications including the binary file or (ii) removing the binary file from the communications.

16. The method of claim 15, wherein the expected behaviors are determined from a plurality of behavior patterns that are stored locally within the detection system or remotely from the detection system, a first behavior pattern of the plurality of behavior patterns representing that a request transmitted over a network is directed to a proxy address specified by a browser application of the virtual environment component.

17. The method of claim 15, wherein the expected behaviors are determined from a plurality of behavior patterns that are stored locally within the detection system or remotely from the detection system and the examining of the one or more behaviors of the executable content against the expected behaviors comprises determining whether a difference is detected between the one or more behaviors produced by the virtual environment component during execution of the executable content of the binary file and a behavior pattern of the plurality of behavior patterns associated with the virtual environment component, the behavior pattern of the plurality of behavior patterns representing one or more parameters of an operating system that should not be altered.

18. The method of claim 15, wherein the examining of the one or more behaviors of the virtual environment component against the expected behaviors comprises
    determining whether a difference is detected between the one or more behaviors produced by the virtual environment component during execution of the executable content of the binary file and a behavior pattern of the expected behavior patterns associated with the virtual environment component, the difference being detected when the one or more behaviors represent a particular process authorized to change an operating system parameter and the one or more behaviors identifies the content of the binary file as malicious content when a process other than the particular process changes the operating system parameter.

19. The method of claim 15, wherein the virtual environment component comprises a virtual environment operating system that performs operations that correspond to operations conducted by an operating system, where the identifying of the executable content of the binary file as malicious includes detecting at least an attempted change to an operating system setting.

20. The method of claim 15, wherein the virtual environment component performs operations of the software component that operates as a browser application.

* * * * *